(12) United States Patent
Hirakawa et al.

(10) Patent No.: US 9,666,890 B2
(45) Date of Patent: May 30, 2017

(54) FUEL CELL

(71) Applicant: SUMITOMO PRECISION PRODUCTS CO., LTD., Amagasaki-shi, Hyogo (JP)

(72) Inventors: Makoto Hirakawa, Hyogo (JP); Shigeru Mizukawa, Hyogo (JP)

(73) Assignee: SUMITOMO PRECISION PRODUCTS CO., LTD., Hyogo (JP)

( * ) Notice: Subject to any disclaimer, the term of this patent is extended or adjusted under 35 U.S.C. 154(b) by 0 days.

(21) Appl. No.: 14/771,193

(22) PCT Filed: Feb. 5, 2014

(86) PCT No.: PCT/JP2014/000607
§ 371 (c)(1),
(2) Date: Aug. 27, 2015

(87) PCT Pub. No.: WO2014/155928
PCT Pub. Date: Oct. 2, 2014

(65) Prior Publication Data
US 2016/0013501 A1    Jan. 14, 2016

(30) Foreign Application Priority Data

Mar. 25, 2013    (JP) .................................. 2013-061858

(51) Int. Cl.
| | | |
|---|---|---|
| *H01M 8/10* | (2016.01) | |
| *H01M 8/0612* | (2016.01) | |
| *H01M 8/2425* | (2016.01) | |
| *H01M 8/2465* | (2016.01) | |
| *H01M 8/2475* | (2016.01) | |
| *H01M 8/04014* | (2016.01) | |

(Continued)

(52) U.S. Cl.
CPC ..... *H01M 8/0618* (2013.01); *H01M 8/04014* (2013.01); *H01M 8/04082* (2013.01); *H01M 8/2425* (2013.01); *H01M 8/2465* (2013.01); *H01M 8/2475* (2013.01); *H01M 2008/1293* (2013.01); *H01M 2300/0074* (2013.01)

(58) Field of Classification Search
CPC ....................................................... H01M 8/10
See application file for complete search history.

(56) References Cited

U.S. PATENT DOCUMENTS

| | | | |
|---|---|---|---|
| 2003/0134174 A1* | 7/2003 | Akikusa | H01M 8/0245 429/423 |
| 2009/0130522 A1 | 5/2009 | Akikusa et al. | |
| 2012/0178008 A1* | 7/2012 | Heo | H01M 8/0432 429/434 |

FOREIGN PATENT DOCUMENTS

| | | |
|---|---|---|
| JP | 09-007624 | 1/1997 |
| JP | 2002-260697 A | 9/2002 |
| JP | 2005-078859 A | 3/2005 |

(Continued)

*Primary Examiner* — Jacob Marks
(74) *Attorney, Agent, or Firm* — Maschoff Brennan

(57) ABSTRACT

A solid oxide fuel cell includes a cell stack, a reformed gas introduction path introducing a reformed gas into the cell stack, an oxidizing agent gas introduction path introducing an oxidizing agent gas into the cell stack, and a cooling gas introduction path introducing a cooling gas into the oxidizing agent gas introduction path. A heat-absorption part absorbing heat is provided in a periphery of the cell stack, and the cooling gas introduction path is connected with the oxidizing agent gas introduction path through the heat-absorption part.

11 Claims, 12 Drawing Sheets

(51) Int. Cl.
*H01M 8/04082* (2016.01)
*H01M 8/124* (2016.01)

(56) References Cited

FOREIGN PATENT DOCUMENTS

| | | |
|---|---|---|
| JP | 2009-205931 A | 9/2009 |
| JP | 2009-238623 A | 10/2009 |
| JP | 2011-065909 A | 3/2011 |
| JP | 2011-091004 A | 5/2011 |
| JP | 2011-134543 A | 7/2011 |
| WO | 99/44252 A1 | 9/1999 |

\* cited by examiner

FUEL CELL

TECHNICAL FIELD

The present invention relates to a solid oxide fuel cell (SOFC) introducing a reformed gas primarily composed of hydrogen and an oxidizing agent gas from one end to the other end thereof, particularly to a solid oxide fuel cell including a stack-type cell stack, and more particularly to a technique of stabilizing a temperature of a cell stack.

BACKGROUND ART

FIG. 1 illustrates an exemplary fuel cell. This fuel cell 101 is a flat plate solid oxide fuel cell, and generates electric power by using a fuel gas such as a town gas, water, and air as an oxidizing agent. The fuel cell 101 includes an evaporator 102, an air preheater 103, a reformer 104, a burner 105, a cell stack 106, and other elements.

The evaporator 102 heats water to generate a water vapor. The generated water vapor is mixed with a fuel gas that is, e.g., desulfurized, and is subsequently sent to the reformer 104. In the reformer 104, the mixed gas of the fuel gas and the water vapor is reformed into a high temperature reformed gas primarily composed of hydrogen, and is subsequently supplied to the cell stack 106.

After being heated in the air preheater 103, the air is supplied to the cell stack 106. During a stationary operation, the supply of a high temperature reformed gas and air allows the cell stack 106 to be held in a predetermined operating temperature range between 700° C.-900° C.

The cell stack 106 includes a cell stack unit made by stacking a plurality of single cells formed in thin plate shapes. In the cell stack 106, an electromotive force is generated through a chemical reaction in each single cell while, at a high operating temperature, a reformed gas passes through an anode of the single cell and air passes through a cathode of the single cell. The electromotive force is extracted from each single cell to generate electric power.

Such a cell stack unit is disclosed in, e.g., Patent Document 1.

The altered, high temperature reformed gas and air exhausted from the cell stack 106 are sent to the burner 105. In the burner 105, the reformed gas and the air are mixed to cause combustion, which heats the reformer 104. An exhaust gas generated in the burner 105 is sent to the air preheater 103 to heat air by a heat exchange, and is subsequently exhausted.

Because the chemical reaction that allows for generating an electromotive force is an exothermic reaction, each single cell generates heat once the generation of electric power has been started. Thus, during a stationary operation, a cooling control that allows for a reduction in a temperature of air introduced to the cell stack 106 is implemented to hold the cell stack 106 in an operating temperature range.

Specifically, a bypass path 108 that bypasses the air preheater 103 is provided on an oxidizing agent gas introduction path 107 that introduces high temperature air into the cell stack 106 through the air preheater 103. Then, the air heated by the air preheater 103 is mixed with cool air, through the bypass path 108, with the flow rate thereof controlled by a flow rate control valve 109, in order to adjust a temperature of the air introduced to the cell stack 106.

An electric power generating system that implements a control similar to the above is disclosed in, e.g., Patent Document 2.

CITATION LIST

Patent Document

Patent Document 1: Japanese Unexamined Patent Publication No. 2011-065909
Patent Document 2: Japanese Unexamined Patent Publication No. 2009-238623

SUMMARY OF THE INVENTION

Technical Problem

FIG. 2 illustrates an exemplary structure of a cell stack. A cell stack 110 is installed on a support base 111, and extends upward. A periphery of a cell stack unit 112 is covered from a top thereof by a tubular cover 113.

A reformed gas and air are introduced from a bottom of the cell stack unit 112 and distributed to each single cell so as to uniformly spread to the entire cell stack unit 112. The reformed gas and the air distributed to each single cell are altered by a chemical reaction that occurs therebetween, and consequently become an anode off-gas and a cathode off-gas.

The anode off-gas is collected through a predetermined path and the cathode off-gas is collected through a gap between the cell stack unit 112 and the cover 113. The collected anode off-gas and cathode off-gas are exhausted from a bottom of the cell stack 110 and sent to a burner in order to serve as combustion fuels.

The cell stack has a peculiar problem that a temperature difference easily occurs between upper and lower portions of the cell stack unit.

More particularly, because a stack-type cell stack takes air from a lower portion thereof, the air cools single cells in turn from the lower side of the cell stack and has a higher temperature as it goes up. In addition, each single cell generates heat, and hot air also rises up. Thus, the upper side of the cell stack unit easily has a higher temperature and is more hardly cooled compared with the lower side of the cell stack unit.

If a temperature of air introduced is significantly reduced to cool the upper side of the cell stack unit, the lower side of the cell stack unit is excessively cooled and this causes widening of a temperature difference between the upper and lower sides of the cell stack unit.

It is an object of the present invention to provide a fuel cell including a stack-type cell stack of which an entire cell stack unit can be cooled uniformly.

Solution to the Problem

The fuel cell disclosed herein is a solid oxide fuel cell. This fuel cell includes a cell stack including an anode electrode and a cathode electrode and comprised of a solid electrolyte, a reformed gas introduction path introducing a reformed gas primarily composed of hydrogen into the cell stack, an oxidizing agent gas introduction path introducing an oxidizing agent gas into the cell stack, and a cooling gas introduction path introducing a cooling gas for reducing a temperature of the oxidizing agent gas into the oxidizing agent gas introduction path.

A heat-absorption part absorbing heat is provided on a periphery of the cell stack. Also, the cooling gas introduction path is connected with the oxidizing agent gas introduction path through the heat-absorption part.

In this fuel cell, the heat-absorption part absorbing heat is provided in the periphery of the cell stack, and thus a cooling gas joins an oxidizing agent gas through the heat-absorption part.

That is, in cooling the cell stack, the heat-absorption part located in a high temperature area of the cell stack is cooled by heat absorption of the cooling gas, and thus the entirety of the cell stack can be cooled uniformly.

Specifically, the periphery of the cell stack is covered by a tubular cover extending along the surroundings.

Consequently, a stable flow of an oxidizing agent gas along the cell stack is formed, and thus the temperature of the whole cell stack can be easily controlled.

More specifically, the cell stack includes a lower end supported by a support base and extends upward in a vertical direction. The introduction portions introducing a reformed gas and an oxidizing agent gas are provided in a lower end portion of the cell stack, and the heat-absorption part is provided in a periphery of an upper portion of the cell stack.

In this case, the introduction portions are provided in the lower end portion of the cell stack. Thus, the lower side of the cell stack is easily cooled, whereas in particular the upper side of the cell stack easily locally reaches a high temperature due to heat generation by single cells or rise of hot air. Thus, in the cell stack, a temperature difference easily occurs. However, because the heat-absorption part is provided in the periphery of the upper portion of the cell stack, the upper portion of the cell stack is effectively cooled by heat absorption of the cooling gas. Accordingly, the entirety of the cell stack can be uniformly cooled.

If the upper portion of the cell stack includes the uppermost layer of the upper portion and the middle layer of the upper portion located under the uppermost layer of the upper portion, the heat-absorption part is preferably provided on the middle layer of the upper portion, not on the uppermost layer of the upper portion.

Although the detail will be described later, this prevents a temperature difference between the uppermost layer and the lower portion from widening over time.

More specifically, the heat-absorption part is comprised of a metal tube installed in a space in the periphery of the cell stack.

Accordingly, the cooling gas absorbs radiant heat dissipated from the cell stack through the metal tube, and thus absorbs heat effectively.

The metal tube is preferably spirally provided in the periphery of the cell stack.

Accordingly, a long, broad heat transfer surface that allows the cooling gas to absorb heat is achieved, and thus the radiant heat is absorbed more effectively.

Moreover, an inlet side of the metal tube is preferably more distanced from the introduction portions than an outlet side thereof is.

Accordingly, the cooling gas travels a long distance from a high temperature side, and thus the radiant heat is absorbed still more effectively.

Advantages of the Invention

According to the fuel cell of the present invention, the entirety of the cell stack can be cooled uniformly, and thus an efficient, stable generation of electric power can be achieved.

DESCRIPTION OF EMBODIMENTS

Embodiments of the present invention will be described in detail below with reference to the drawings. The following embodiments are merely preferred examples in nature, and are not intended to limit the present invention, applications thereof, or usage thereof.

(Basic Configuration of Fuel Cell)

Figure 3:
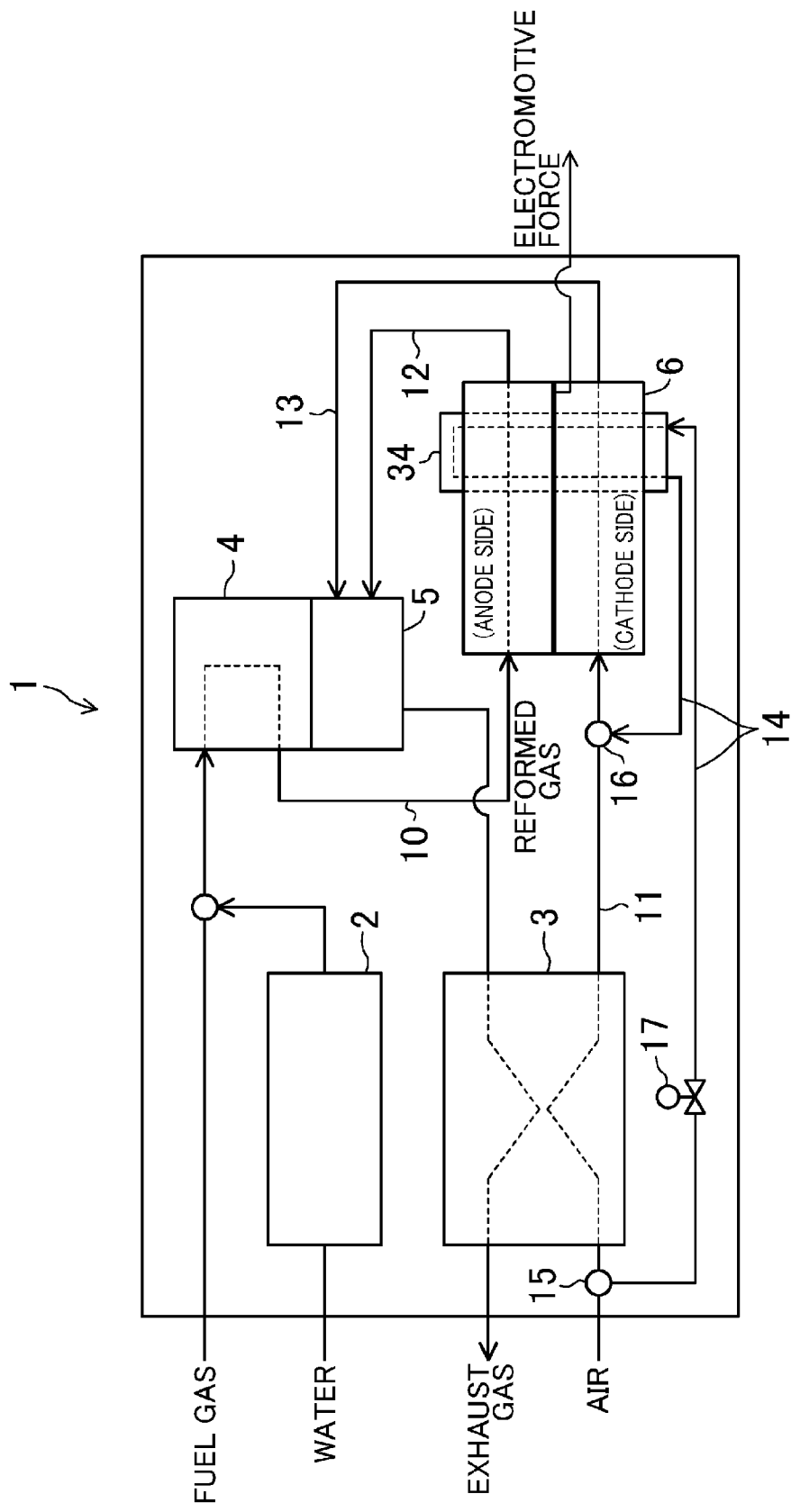
FIG. 3 is a general view of a configuration of a fuel cell according to an embodiment.

FIG. 3 illustrates a solid oxide fuel cell (SOFC) 1 according to the present invention. There is not much difference between a basic configuration of the fuel cell 1 and that of the fuel cell 101 shown in FIG. 1.

In other words, this fuel cell 1 includes an evaporator 2, an air preheater 3, a reformer 4, a burner 5, a cell stack 6, and other elements, and generates electric power by using a fuel gas such as a town gas, water, and an oxidizing agent gas and extracting electromotive force from the cell stack 6.

A gas, e.g., air at a low cost, that contains a predetermined amount of oxygen may be used as an oxidizing agent gas. The oxidizing agent gas is not limited to air, and any gas containing oxygen may be used.

The evaporator 2 heats water to generate a water vapor. The generated water vapor is mixed with a fuel gas that is, e.g., desulfurized, and is subsequently sent to the reformer 4. In the reformer 4, the mixed gas of a fuel gas and a water vapor is reformed into a gas (a reformed gas), primarily composed of hydrogen, which is introduced into the cell stack 6 through a reactant gas introduction path 10.

The air preheater 3 heats outside air to generate a high temperature oxidizing agent gas (a heated oxidizing agent gas). The generated heated oxidizing agent gas is introduced into the cell stack 6 through an oxidizing agent gas introduction path 11. A high temperature reformed gas altered in the cell stack 6 (an anode off-gas) is sent to the burner 5 through an anode-side exhaust path 12. A heated oxidizing agent gas altered in the cell stack 6 (a cathode off-gas) is sent to the burner 5 through a cathode-side exhaust path 13.

The anode off-gas contains a redundant fuel. Thus, when the anode off-gas is mixed with the cathode off-gas in the burner 5, combustion occurs and consequently the reformer 4 is heated. An exhaust gas produced in the burner 5 is sent to the air preheater 3 to heat the oxidizing agent gas, and is subsequently exhausted.

Moreover, also in this fuel cell 1, in order to control cooling of a temperature of a heated oxidizing agent gas introduced into the cell stack 6, a cooling gas introduction path 14 that bypasses the air preheater 3 is provided on the oxidizing agent gas introduction path 11 that passes through the air preheater 3.

Specifically, an upstream end portion of the cooling gas introduction path 14 is connected with a branch portion 15, of the oxidizing agent gas introduction path 11, provided upstream of the air preheater 3, and the cooling gas introduction path 14 branches from the branch portion 15. A downstream end portion of the cooling gas introduction path 14 is connected with a joining portion 16, of the oxidizing agent gas introduction path 11, provided downstream of the air preheater 3, and the cooling gas introduction path 14 joins the joining portion 16.

Halfway on the cooling gas introduction path 14, provided is a flow rate control valve 17 that allows for adjusting a flow rate of a cooling gas flowing in the cooling gas introduction path 14. In this fuel cell 1, the cooling gas flowing in the cooling gas introduction path 14 is used so that the problem of the temperature difference in the cell stack 6 is solved.

The cooling gas joins air serving as an oxidizing agent gas in the end. Thus, the cooling gas may be a gas, such as nitrogen, that does not contain oxygen. Any gas that does not affect generation of electric power after joining and mixing with another gas may be used. For example, air is easy to handle because it has the same composition as that of an oxidizing agent gas.

(Configuration of Main Part of Fuel Cell)

Figure 4:
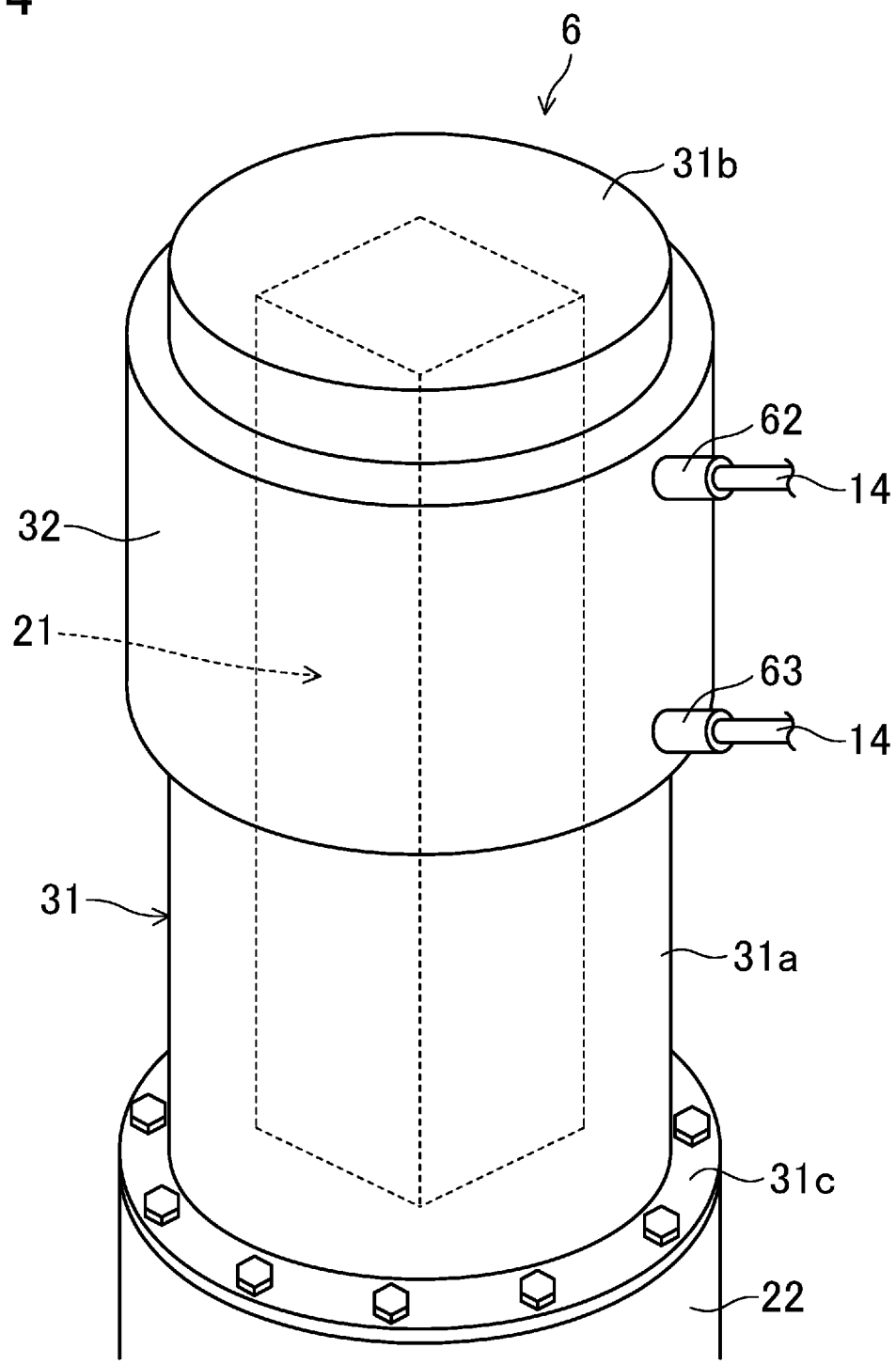
FIG. 4 is a general perspective view of the cell stack.
Figure 5:
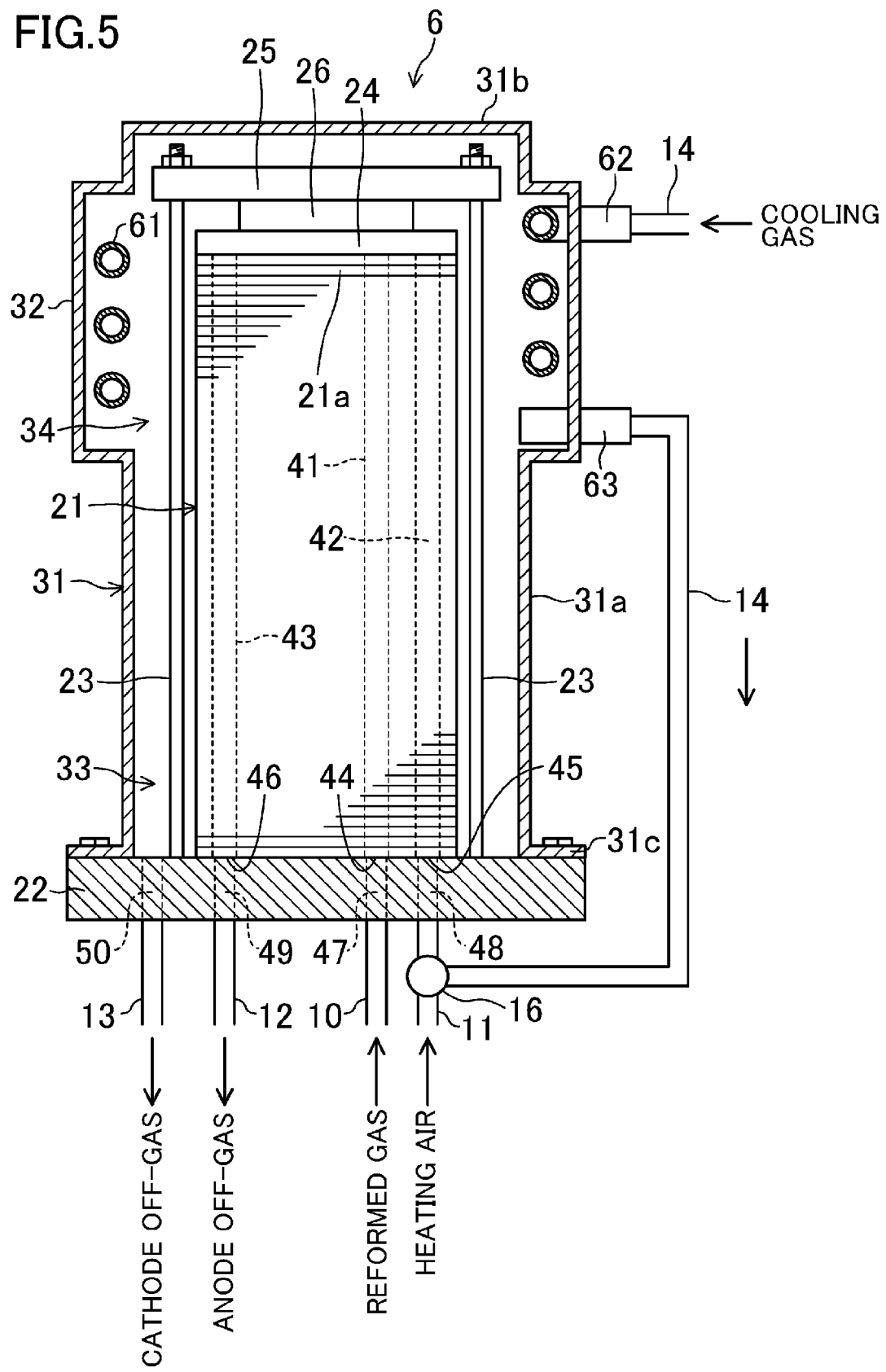
FIG. 5 is a general cross sectional view of the cell stack.

FIGS. 4 and 5 illustrate the cell stack 6 of the fuel cell 1. This cell stack 6 is a so-called stack-type cell stack. The cell stack 6 includes a cell stack unit 21, a cover 31, and other elements, and is vertically installed on the support base 22. The cell stack unit 21 is located inside the cover 31. Also, a lower end of the cell stack unit 21 is supported on the support base 22, and the cell stack unit 21 extends upward in the vertical direction.

As illustrated in FIG. 5, similarly to a conventional cell stack unit, the cell stack unit 21 is comprised of a plurality of thin plate-like single cells 21a stacked so as to extend in the thickness direction of the single cells 21a, with interconnectors interposed therebetween. Each single cell 21a includes a solid electrolyte made of yttria-stabilized zirconia etc. An anode electrode is formed on one of surfaces of the solid electrolyte, and a cathode electrode is formed on the other surface of the solid electrolyte.

An anode-side reaction gap alternates with a cathode-side reaction gap in the gap between each pair of adjacent single cells 21a (not shown). The stacked single cells 21a are supported integrally by, e.g., support rods 23 and a holding plate 24.

The plurality of support rods 23 are provided on the support base 22 to surround the cell stack unit 21, and extend upward in the vertical direction. The holding plate 24 is mounted on an upper end surface of the cell stack unit 21. A support plate 25 is fastened to an upper end portion, of the support rod 23, that more protrudes than the holding plate 24.

A spring member 26 is provided on a lower surface of the support plate 25, and the support plate 25 presses the holding plate 24 downwardly through the spring member 26. Consequently, the stacked single cells 21a are compressively secured by the support base 22 and the holding plate 24.

The cover 31 includes a cylindrical side wall portion 31a larger than the cell stack unit 21, an end wall portion 31b blocking an opening located on an upper end of the side wall portion 31a, and a ring-shaped flange portion 31c protruding outward from a lower end edge of the side wall portion 31a.

In particular, this cover 31 includes a large-diameter portion 32 formed in a certain region of an upper portion of the side wall portion 31a, having a relatively large diameter, and expanding outward in the diameter direction.

The region where the large-diameter portion 32 is formed is supposed to be above and away from an anode-side inlet 44 and a cathode-side inlet 45 described later, and is more preferably formed above a middle position that is at an equal distance from the upper and lower ends of the side wall portion 31a.

The cover 31 is attached to the support base 22 by fastening the flange portion 31c to the support base 22 in a state in which the cover 31 covers the cell stack unit 21. The cover 31 extends in the vertical direction along the cell stack unit 21. Consequently, a gap space 33 having a constant width is formed between a side surface of the cell stack unit 21 and an inner surface of the side wall portion 31a. A larger space (a heat-absorption space 34) is formed between an upper portion of the side surface of the cell stack unit 21 and an inner surface of the large-diameter portion 32. A metal tube 61 is provided in this heat-absorption space 34. This will be described later.

An anode-side intake manifold 41, a cathode-side intake manifold 42, and an exhaust manifold 43 are formed inside the cell stack unit 21 so as to extend along the stacking direction. The anode-side reaction gap of each single cell 21a communicates with the anode-side intake manifold 41 and the exhaust manifold 43. The cathode-side reaction gap communicates with the cathode-side intake manifold 42 and the gap space 33.

The anode-side intake manifold 41 includes the anode-side inlet 44 (an introduction portion) on a lower end surface of the cell stack unit 21, and the cathode-side intake manifold 42 includes the cathode-side inlet 45 (an introduction portion) on the lower end surface of the cell stack unit 21. The exhaust manifold 43 includes an anode-side outlet 46 on the lower end surface of the cell stack unit 21. The anode-side inlet 44, the cathode-side inlet 45, and the anode-side outlet 46 are adjacent to one another.

An anode-side inlet hole 47, a cathode-side inlet hole 48, an anode-side outlet hole 49, and a cathode-side outlet hole 50 are cut in an upper surface of the support base 22. The anode-side inlet hole 47 communicates with the anode-side intake manifold 41 through the anode-side inlet 44. The cathode-side inlet hole 48 communicates with the cathode-side intake manifold 42 through the cathode-side inlet 45. The anode-side outlet hole 49 communicates with the exhaust manifold 43 through the anode-side outlet 46. The cathode-side outlet hole 50 communicates with the gap space 33.

The anode-side inlet hole 47 is connected with a downstream end portion of the reactant gas introduction path 10. The cathode-side inlet hole 48 is connected with a downstream end portion of the oxidizing agent gas introduction path 11. The anode-side outlet hole 49 is connected with an upstream end portion of the anode-side exhaust path 12. The cathode-side outlet hole 50 is connected with an upstream end portion of the cathode-side exhaust path 13.

Thus, a high temperature reformed gas is introduced into each anode-side reaction gap through the anode-side inlet hole 47 and the anode-side intake manifold 41, and a heated oxidizing agent gas is introduced into each cathode-side reaction gap through the cathode-side inlet hole 48 and the cathode-side intake manifold 42. The cell stack unit 21 is heated by the reformed gas and the heated oxidizing agent gas as heat sources.

When the cell stack unit 21 is heated, a chemical reaction occurs, in each single cell 21a, between a reformed gas passing through the anode-side reaction gap and a heated oxidizing agent gas passing though the cathode-side reaction gap. The reformed gas altered by the chemical reaction is discharged from the cell stack 6 through the exhaust manifold 43. The heated oxidizing agent gas altered by the chemical reaction is discharged from the cell stack 6 through the gap space 33.

The chemical reaction allows each single cell 21a to generate an electromotive force. The electric power is generated by extracting that electromotive force. In general, electric power is generated at 700° C.-900° C., and in particular, efficiently generated at around 800° C. Thus, it is preferable to hold the entirety of the cell stack unit 21 at around 800° C.

Each single cell 21a generates heat by a chemical reaction. Thus, in this fuel cell 1, during a stationary operation, a cooling control for cooling the cell stack unit 21 as necessary by reducing a temperature of the heated oxidizing agent gas is implemented to maintain a predetermined operating temperature range.

Specifically, the joining portion 16 is located in a portion, of the oxidizing agent gas introduction path 11, near the cathode-side inlet hole 48, and in the joining portion 16, a cooling gas joins and mixes with a heated oxidizing agent gas to reduce a temperature of the heated oxidizing agent gas. The temperature of the heated oxidizing agent gas is controlled by adjusting the flow rate of the cooling gas.

In this case, in this fuel cell 1, the cooling gas introduction path 14 is connected with the joining portion 16 through the metal tube 61 (a heat-absorption part) provided in the heat-absorption space 34, in order to uniformly cool the entirety of the cell stack unit 21 by using the characteristics of the stack-type cell stack 6.

Figure 6:
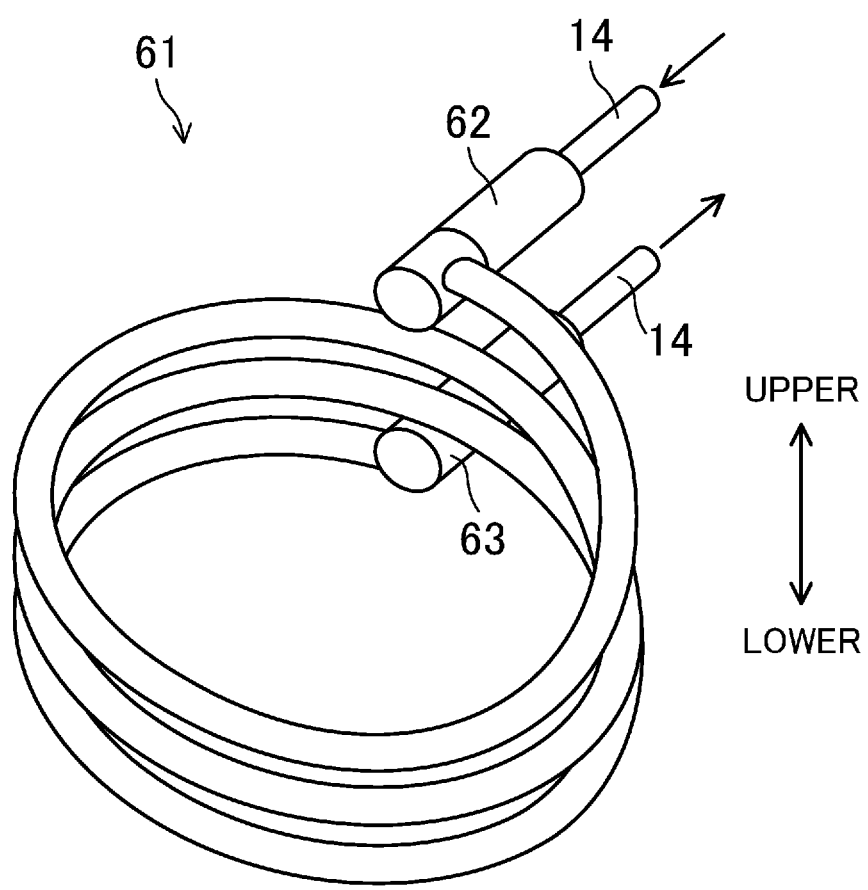
FIG. 6 is a general perspective view of a metal tube.

As illustrated in FIG. 6, the metal tube 61 is made of a metal having an excellent thermal conductivity, formed in a spiral shape, and accommodated in the heat-absorption space 34. The metal tube 61 is installed around an upper portion of the cell stack unit 21, and faces the cell stack unit 21 with a gap interposed therebetween.

In other words, the metal tube 61 is provided to surround a periphery of the cell stack unit 21, and more particularly, spirally surround the periphery of the cell stack unit 21. The word "surround" in this embodiment includes surrounding at least a half of the periphery.

More specifically, an upstream connecting portion 62 connected with one end of the metal tube 61 is installed on an upper side of the large-diameter portion 32, and a downstream connecting portion 63 connected with the other end of the metal tube 61 is installed on a lower side of the large-diameter portion 32.

The metal tube 61 is fixed inside the cover 31. If the metal tube 61 is fixed on the cell stack 6, insulation is required between the metal tube 61 and the cell stack 6. However, if the metal tube 61 is fixed on the cover 31, it is not in contact with the cell stack 6, and no insulation is required. Consequently, the metal tube 61 is positioned with the heat-absorption space 34 kept optimum.

Also, even if the cover 31 is in a different cylindrical shape, the metal tube 61 can be positioned in a predetermined position relative to the cell stack 6, and can be covered by the cover 31 in a subsequent stage.

A downstream end portion of the cooling gas introduction path 14 extending from the branch portion 15 is connected with the upstream connecting portion 62 and communicates with the metal tube 61. An upstream end portion of the cooling gas introduction path 14 extending from the joining portion 16 is connected with the downstream connecting portion 63 and communicates with the metal tube 61. Consequently, a cooling gas enters the metal tube 61 from the upstream connecting portion 62, and exits from the downstream connecting portion 63.

When a control for reducing a temperature of the cell stack unit 21 is implemented during a stationary operation, the flow rate control valve 17 is activated to raise the flow rate of a cooling gas. Consequently, a temperature of a heated oxidizing agent gas to be introduced to the cell stack unit 21 is reduced. The heated oxidizing agent gas having a reduced temperature is introduced from the lower end of the cell stack unit 21. Thus, the single cells 21a are cooled in turn from the lower side of the cell stack unit 21, and the heated oxidizing agent gas has a higher temperature as it goes up the cathode-side intake manifold 42.

Further, because the cell stack 6 is provided vertically, an upper portion thereof easily has a high temperature due to rise of hot air. Also, each single cell 21a generates heat, which is added to the heated oxidizing agent gas. As a result, the upper portion of the cell stack unit 21 might be cooled insufficiently.

If a temperature of the heated oxidizing agent gas is significantly reduced to cool the upper side of the cell stack 6, the lower side of the cell stack 6 is cooled excessively, and conversely the temperature difference between the upper and lower sides of the cell stack 6 is increased. This tendency is stronger as the number of stacks of the single cells 21a is larger.

In contrast, in the fuel cell 1, a cooling gas does not directly join a heated oxidizing agent gas but through the metal tube 61. The metal tube 61 is installed in the heat-absorption space 34 provided around the upper portion of the cell stack unit 21, and thus effectively absorbs radiant heat dissipated from the cell stack unit 21. Consequently, in passing through the metal tube 61, the cooling gas absorbs heat on the upper portion of the cell stack unit 21, and thus a temperature of the upper portion of the cell stack unit 21 is relatively reduced.

Moreover, the cooling gas efficiently absorbs radiant heat because the metal tube 61 is installed so as to allow the cooling gas to pass around the cell stack 6 from top to bottom and travel a long distance from the high temperature side. Even if a temperature of the cooling gas increases by the heat absorption, it does not increase over a temperature of the heated oxidizing agent gas. Thus, the cooling gas does not lose the intrinsic cooling function.

Then, the heated oxidizing agent gas is mixed with the cooling gas in the joining portion 16, and the heated oxidizing agent gas having a reduced temperature is introduced into the cell stack unit 21. However, in comparison with a conventional fuel cell, as a temperature of the cooling gas rises, a decrease in a temperature of the heated oxidizing agent gas introduced into the cell stack unit 21 is smaller. Thus, the single cells 21a located in the lower side of the cell stack unit 21 are cooled gradually.

As can be seen, in this fuel cell 1, the upper portion of the cell stack unit 21 is cooled by the absorption of radiant heat by the cooling gas, and the lower portion of the cell stack unit 21 is gradually cooled by the introduction of the cooling gas having a temperature increased by the absorption of heat by the upper portion of the cell stack unit 21. Thus, even in the stack-type cell stack 6, the entirety of the cell stack unit 21 can be uniformly cooled.

COMPARATIVE EXAMPLE AND EXAMPLE

Figure 7:
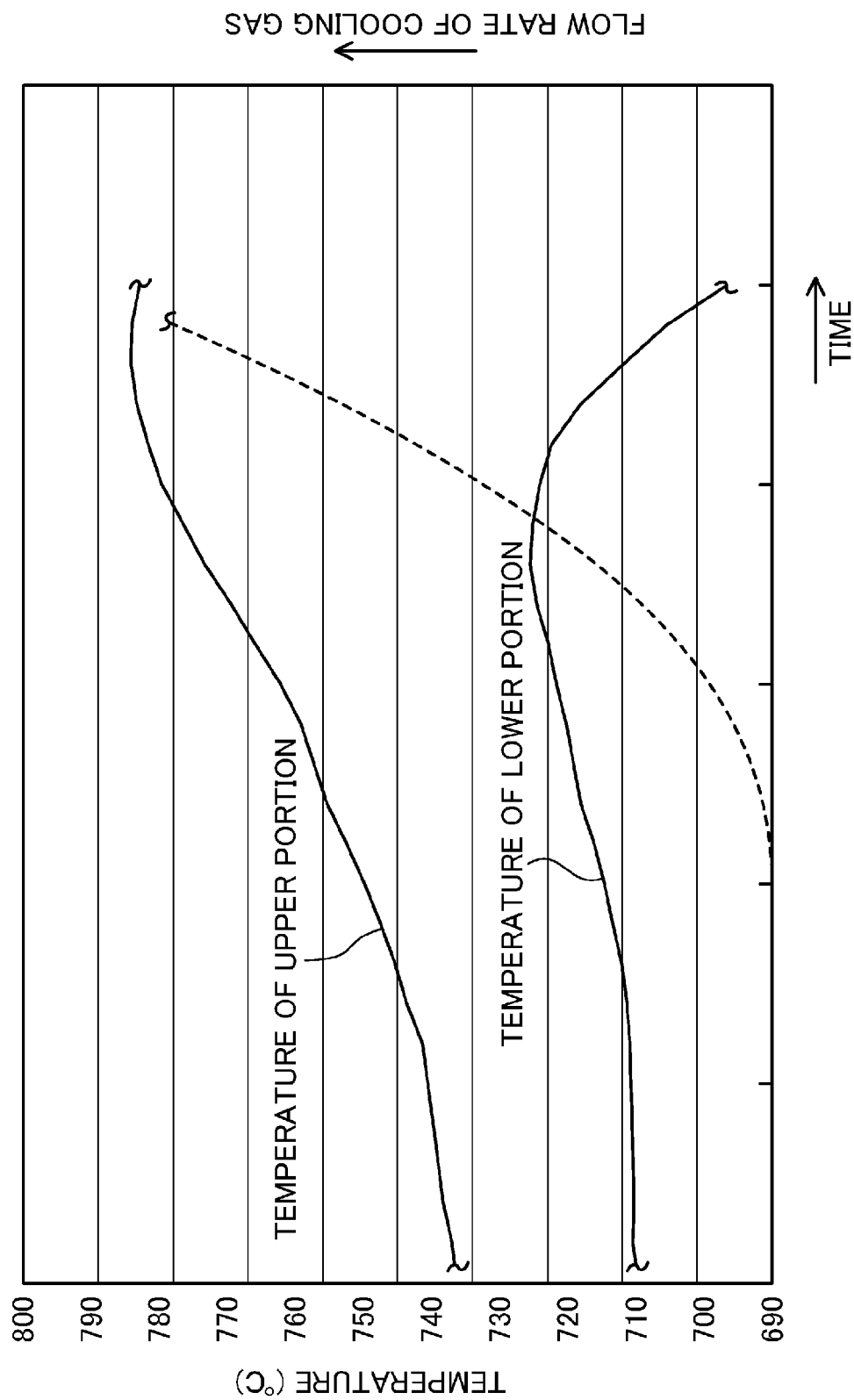
FIG. 7 is a graph showing a test result of a comparative example.
Figure 8:
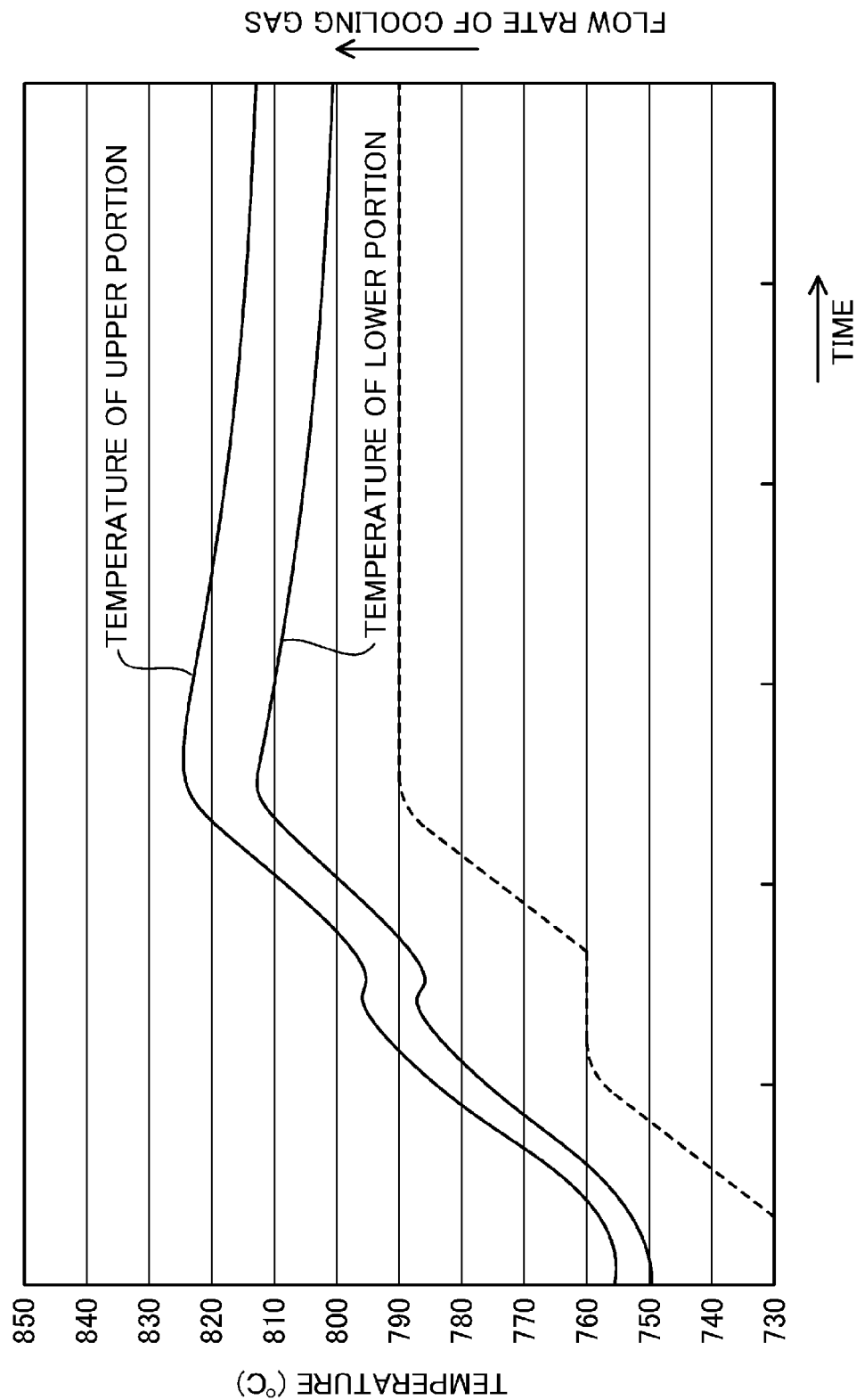
FIG. 8 is a graph showing a test result of the embodiment.

FIGS. 7 and 8 show results of demonstration tests conducted with test equipments.

Figure 1:
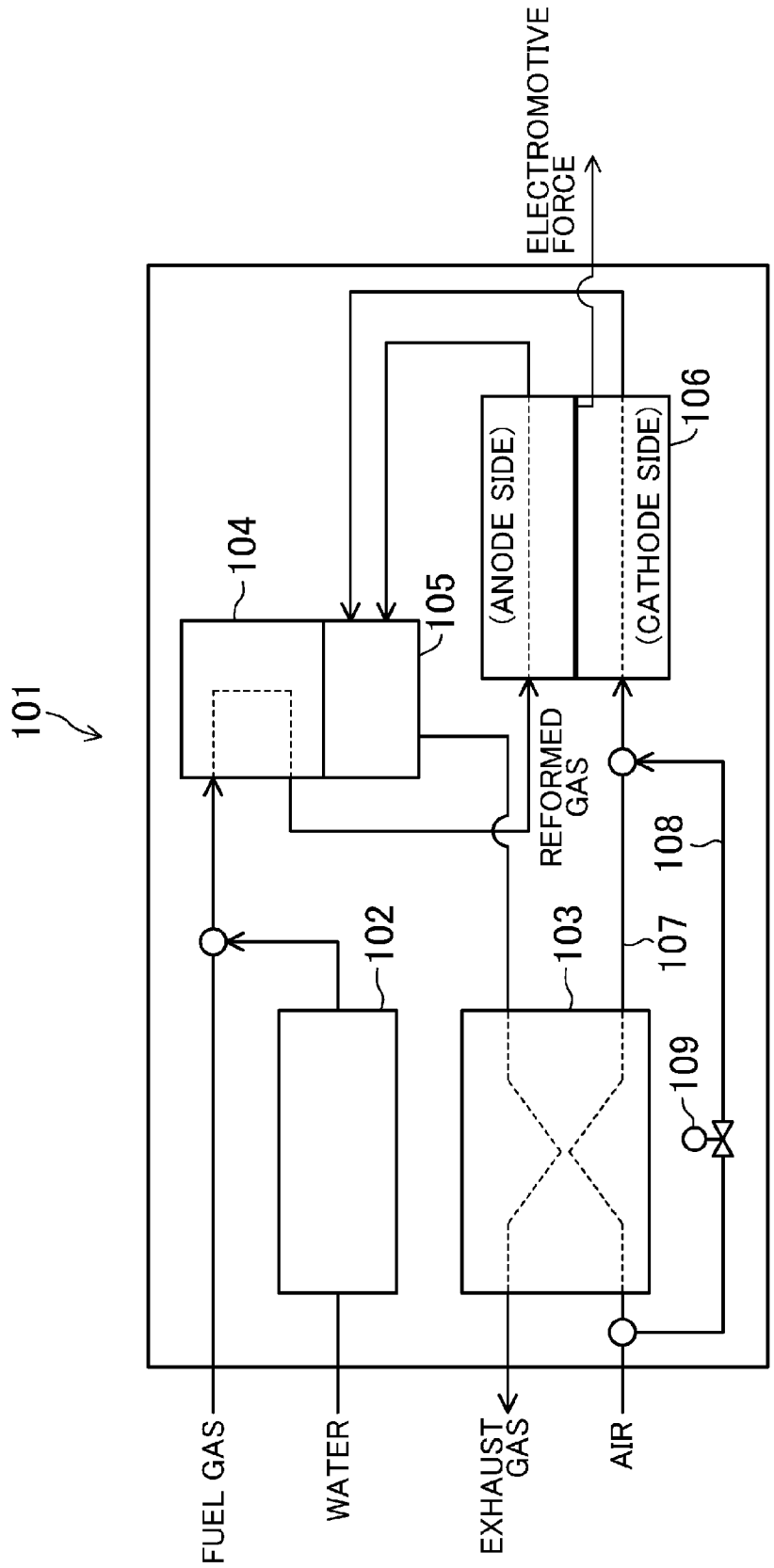
FIG. 1 is a schematic view showing a configuration of a conventional fuel cell.
Figure 2:
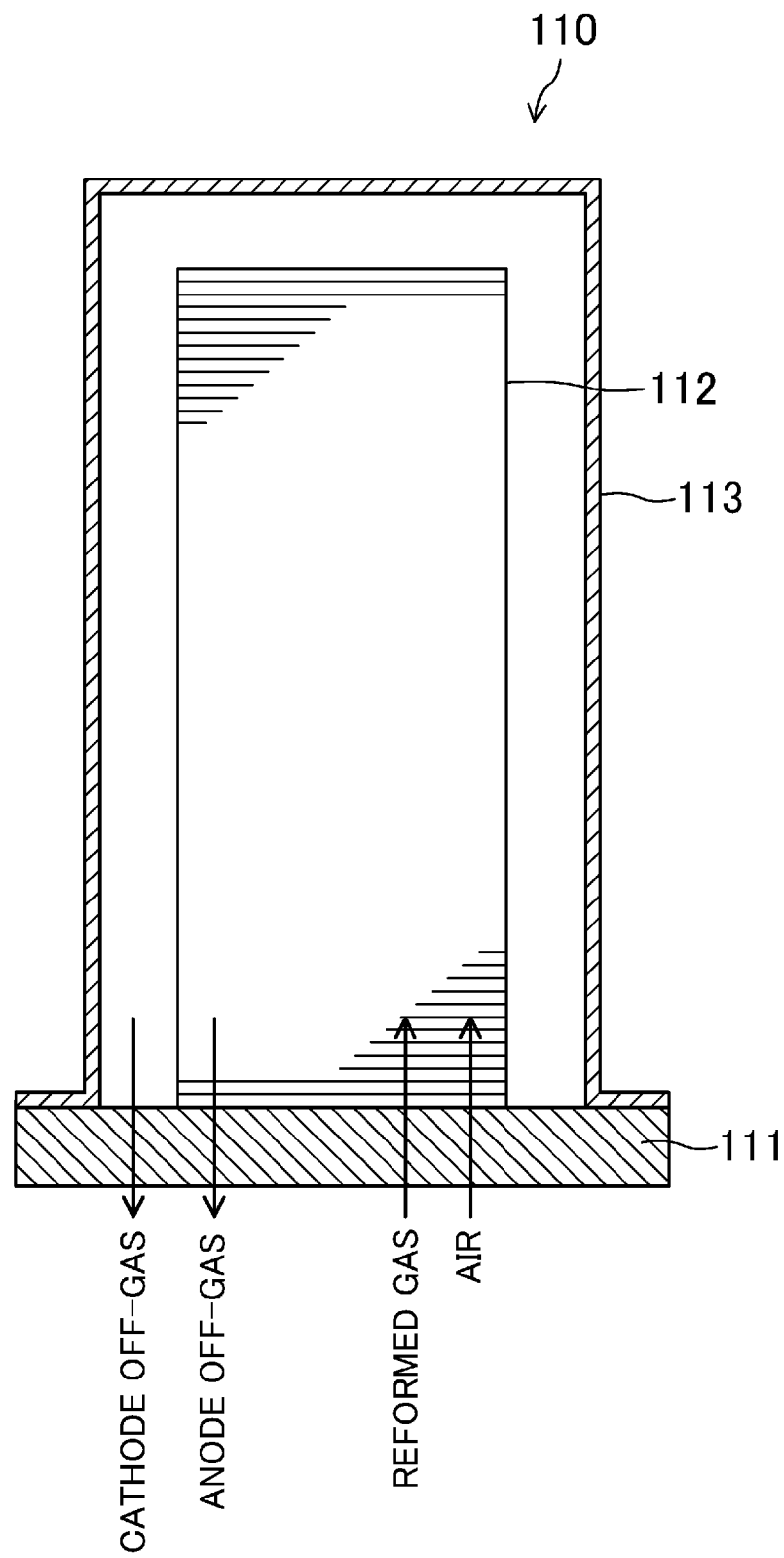
FIG. 2 is a general view of a conventional stack-type cell stack.

FIG. 7 shows a test result of a comparative example. A fuel cell of the comparative example has a conventional configuration as illustrated in FIGS. 1 and 2. A periphery of a cell stack unit is simply covered by a cover, and a cooling gas is directly mixed with a heated oxidizing agent gas.

FIG. 7 shows temperature states immediately before a stationary operation. In the figure, a solid line on the lower side indicates a temperature change in a lower portion of a cell stack unit, and a solid line on the upper side indicates a temperature change in an upper portion of the cell stack unit. A broken line indicates a flow rate change in a cooling gas.

It was found that, in the fuel cell of the comparative example, a temperature difference between the upper and lower portions of the cell stack unit was 20° C. or more at a stage before an introduction of a cooling gas. Moreover, it was found that, if the flow rate of the cooling gas was raised in response to an increase in a temperature of the upper portion of the cell stack unit, a temperature of the lower portion of the cell stack unit started to decrease, and consequently the temperature difference between the upper and lower portions of the cell stack unit tended to widen.

Further, it was found that, if the flow rate of the cooling gas was significantly raised, an increase in a temperature of the upper portion of the cell stack unit was decreased, and the temperature tended to be stable at 780-790° C. However, in this case, it was found that the temperature in the lower portion of the cell stack unit sharply decreased to 710° C. or less, and consequently the temperature difference between the upper and lower portions of the cell stack unit became 70° C. or more.

FIG. 8 shows a test result of the example. The fuel cell of the example has configurations illustrated in FIGS. 3 and 4, etc. The configurations of this example are set to the same as those of the comparative example except the configurations of the cooling gas introduction path and other elements to be compared.

FIG. 8 shows a temperature change in a stationary operation state at a temperature that is made relatively high for a test purpose. Similarly to FIG. 7, a solid line on the lower side indicates a temperature change in the lower portion of the cell stack unit. A solid line on the upper side indicates a temperature change in the upper portion of the cell stack unit. A broken line indicates a flow rate change in a cooling gas.

It was found that, in the fuel cell of the example, a temperature difference between the upper and lower portions of the cell stack unit was approximately 5° C. at a stage before an introduction of a cooling gas. It was found that the temperatures of the upper portion and the lower portion of the cell stack unit increased with the temperature difference therebetween kept approximately constant, and the temperature difference between the upper portion and the lower portion of the cell stack unit did not tend to widen.

When the cooling gas was introduced and the flow rate thereof was raised, the temperatures of the upper portion and the lower portion of the cell stack unit started to decrease at around 820° C. with almost the same timing. At this time, the temperature difference was approximately 10° C.

It was found that if the flow rate of the cooling gas was held constant from the time of the start of decrease in a temperature, the temperatures of the upper portion and the lower portion of the cell stack unit decreased slowly with the temperature difference of approximately 10° C. held, and then tended to converge to 800° C. That is, it was found that the entirety of the cell stack unit could be held at an optimum operating temperature of around 800° C., and thus an electric power could be generated stably.

(Variation)

Figure 9:
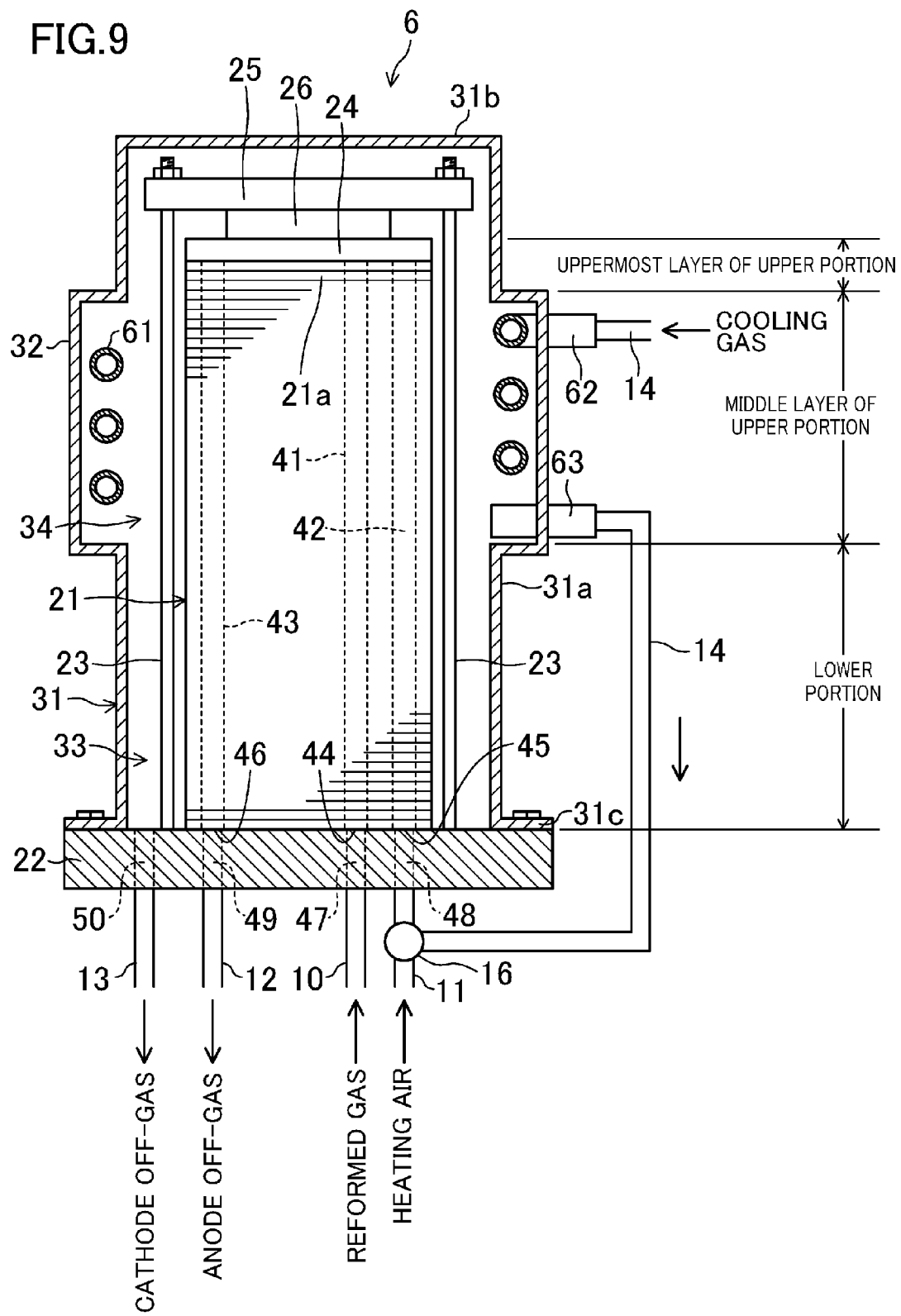
FIG. 9 illustrates a variation of the fuel cell according to the embodiment and corresponds to FIG. 5.

FIG. 9 illustrates a variation of the above-described fuel cell 1. In the fuel cell of this variation, the locations of a large-diameter portion 32, a metal tube 61, and a heat-absorption space 34 are different from those of the above-described fuel cell 1.

As illustrated in FIG. 5, in the above-described fuel cell 1, the large-diameter portion 32 and some other elements are provided to reach the uppermost portion of the cell stack unit 21 (the uppermost layer of the upper portion). However, it was found that such layouts of the large-diameter portion 32 and the other elements tended to cause a widened temperature difference over time between the uppermost layer of the upper portion and the lower portion.

In other words, in the above-described example, the uppermost layer of the upper portion was measured as an example of the upper portion. However, it was found that when a temperature of a middle layer of the upper portion was measured alternatively, the temperature tended to be higher than that of the uppermost layer of the upper portion. Then, it was found that when the flow rate of the cooling gas was adjusted to cool the middle layer, the upper portion (the uppermost layer of the upper portion) was cooled so much that the temperature of the upper portion was decreased to below the temperature of the lower portion.

Figure 10:
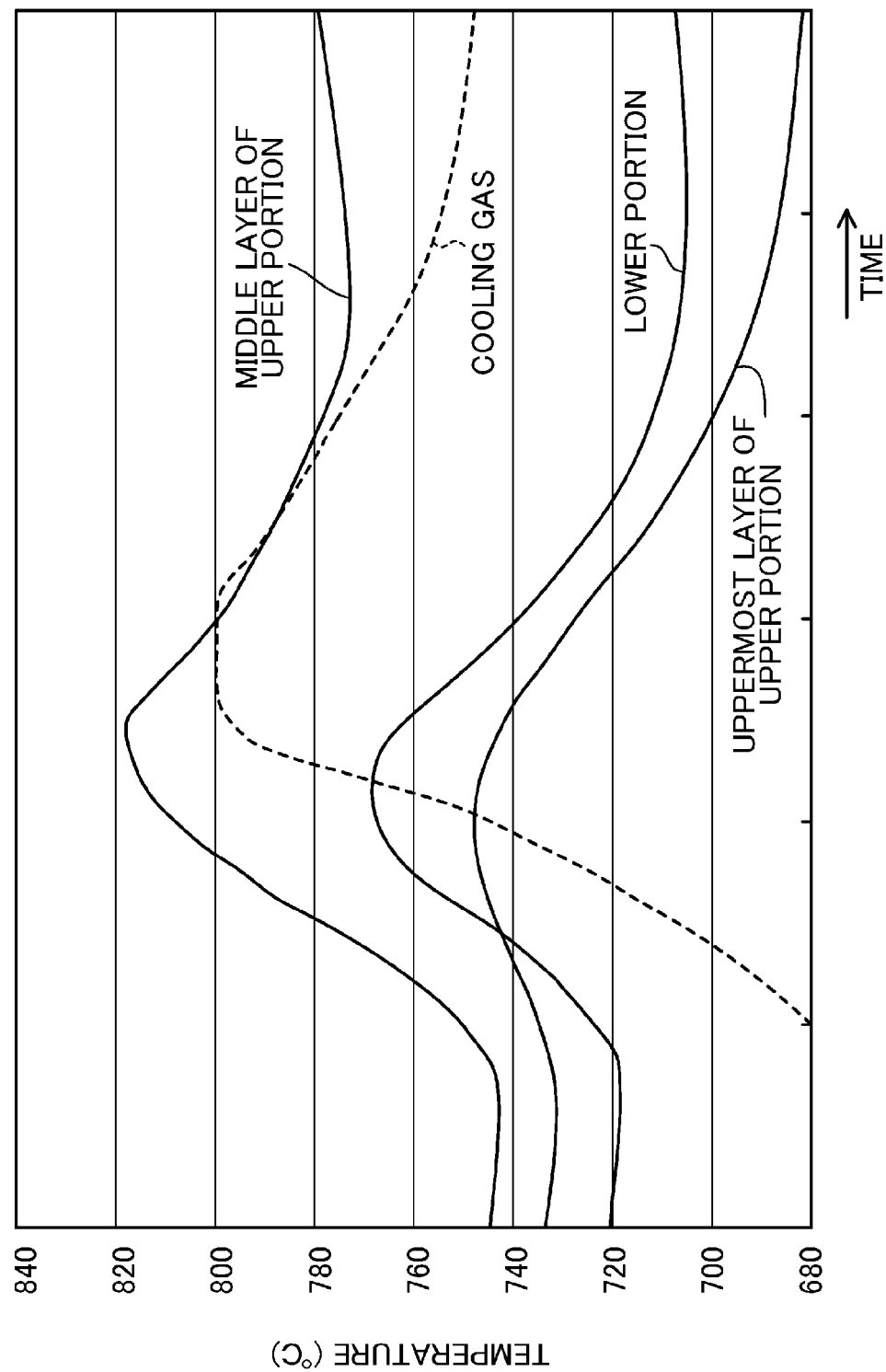
FIG. 10 is a graph showing temperature changes according to portions of a cell stack unit of the fuel cell according to the embodiment.

FIG. 10 is a graph showing such changes as described above, and a broken line indicates a flow rate change in the cooling gas. As shown in FIG. 10, it was found that if the large-diameter portion 32 and some other elements were provided to reach the uppermost layer of the upper portion, the uppermost layer of the upper portion was cooled so much that a temperature thereof became rather lower than a temperature of the lower portion at some point, and the temperature difference between the uppermost layer of the upper portion and the lower portion tended to widen over time.

Figure 11:
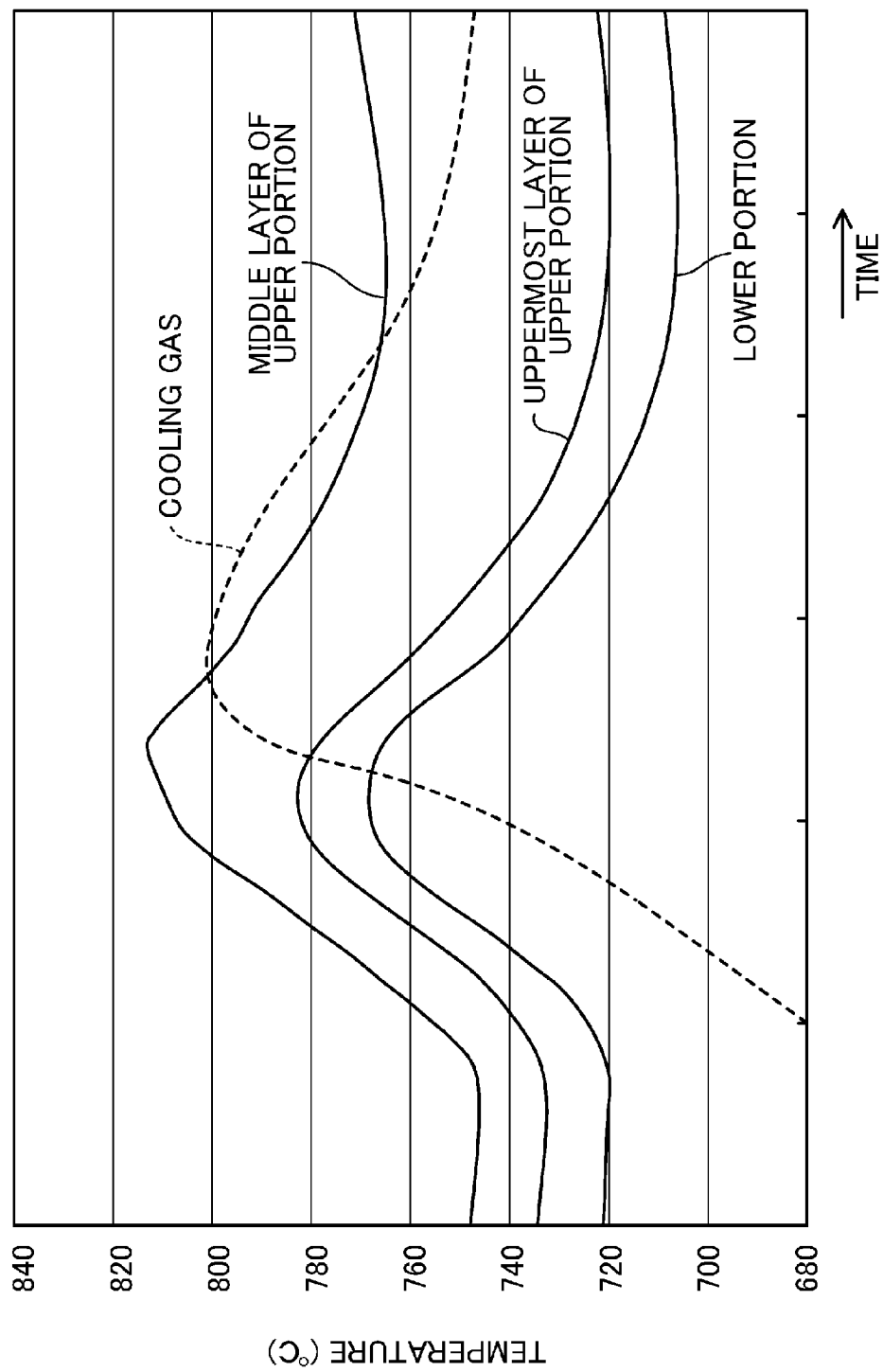
FIG. 11 is a graph showing temperature changes according to portions of the cell stack of the fuel cell according to a variation.

Then, as a result of a study, as illustrated in FIG. 9, the locations of the large-diameter portion 32 and some other elements were shifted downward, and the upper portion were defined so as to include "the uppermost layer of the upper portion" and "the middle layer of the upper portion." In this case, as shown in a graph of FIG. 11, the temperature difference between the uppermost layer of the upper portion and the lower portion did not widen over time by providing the large-diameter portion 32 and some other elements on the middle layer of the upper portion, not on the uppermost layer of the upper portion.

Thus, according to the fuel cell of this variation, regardless of the lapse of time, the entirety of the cell stack unit 21 can be cooled uniformly, and electric power can be generated more efficiently and stably.

(Others)

The fuel cell of the present invention is not limited to the above-described embodiments, and may include other various configurations.

Figure 12:
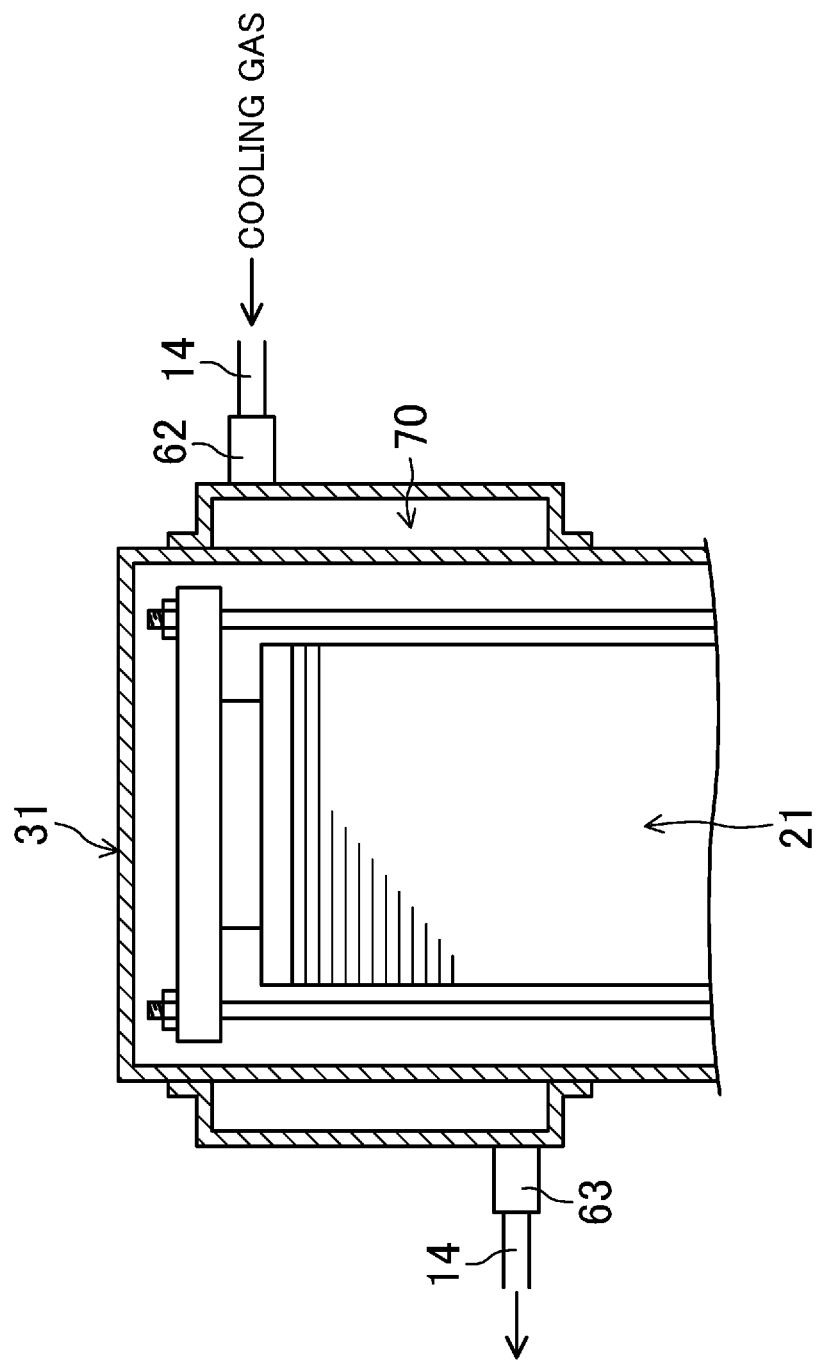
FIG. 12 is a general view of a main portion of another variation.

The structure of the heat-absorption part is not limited to the spiral metal piping. For example, as illustrated in FIG. 12, a double tube structure may be provided on the upper portion of the cover 31 to form an annular space 70 in which a cooling gas flows along the periphery of the cell stack unit.

The heat-absorption part may be provided in any area as long as it is away from the introduction portion. For example, if the introduction portion is provided on the upper end of the cell stack unit 21, the heat-absorption part may be provided in any area as long as it is on the periphery of the lower portion of the cell stack unit 21. In addition, if the introduction portion is provided on an intermediate portion of the cell stack unit 21, the heat-absorption part may be provided in any area as long as it is on either one of the peripheries of the upper portion and the lower portion of the cell stack unit 21, or on both the peripheries thereof.

The cell stack 6 is not limited to a vertical layout, and may be provided in a horizontal layout.

In addition, the cell stack is not limited to a stack-type cell stack, and may be, e.g., a cell stack comprised of a cylindrical cell tube.

Specifically, such a cell stack comprised of a cylindrical cell tube includes the following configurations.

The cell stack comprised of a cylindrical cell tube includes a cylindrical cell unit and electrode terminals connected to both ends of the cell unit. In the cell unit, provided are a cylindrical inside electrode layer, a cylindrical outside electrode layer, and an electrolyte layer provided therebetween. The inside electrode layer is a fuel electrode, and the outside electrode layer is an air electrode. The inside electrode layer is electrically connected to the electrode terminals. A fuel gas passage is formed in a central portion of the electrode terminal.

DESCRIPTION OF REFERENCE CHARACTERS

1 Fuel Cell
6 Cell Stack
10 Reactant Gas Introduction Path
11 Oxidizing Agent Gas Introduction Path
12 Anode-Side Exhaust Path
13 Cathode-Side Exhaust Path
14 Cooling Gas Introduction Path
21 Cell Stack Unit
21a Single Cell
22 Support Base
23 Support Rod
31 Cover
32 Large-Diameter Portion
34 Heat-Absorption Space
41 Anode-Side Intake Manifold
42 Cathode-Side Intake Manifold
43 Exhaust Manifold
44 Anode-Side Inlet (Introduction Portion)
45 Cathode-Side Inlet (Introduction Portion)
61 Metal Tube
62 Upstream Connecting Portion
63 Downstream Connecting Portion

The invention claimed is:

1. A solid oxide fuel cell, comprising:
a cell stack including an anode electrode and a cathode electrode and comprised of a solid electrolyte;
a reformed gas introduction path introducing a reformed gas primarily composed of hydrogen into the cell stack;
an oxidizing agent gas introduction path introducing an oxidizing agent gas, heated by a preheater, into the cell stack; and
a cooling gas introduction path bypassing the preheater and introducing the oxidizing agent gas into the oxidizing agent gas introduction path, wherein
a heat-absorption part absorbing heat is provided on a periphery of the cell stack, and
the cooling gas introduction path branches from a branch portion provided upstream of the preheater in the oxidizing agent gas introduction path, and, through the heat-absorption part, is connected with a joining portion provided downstream of the preheater in the oxidizing agent gas introduction path and upstream of the cell stack.

2. The fuel cell of claim 1, wherein:
the periphery of the cell stack is covered by a tubular cover extending along the cell stack.

3. The fuel cell of claim 1, wherein:
the cell stack includes a lower end supported by a support base and extends upward in a vertical direction,
introduction portions introducing the reformed gas and the oxidizing agent gas are provided in a lower end portion of the cell stack, and
the heat-absorption part is provided in a periphery of an upper portion of the cell stack.

4. The fuel cell of claim 3, wherein:
the upper portion of the cell stack includes an uppermost layer of the upper portion and a middle layer of the upper portion located under the uppermost layer of the upper portion, and
the heat-absorption part is provided on the middle layer of the upper portion, not on the uppermost layer of the upper portion.

5. The fuel cell of claim 1, wherein:
the heat-absorption part is comprised of a metal tube installed in a space in the periphery of the cell stack.

6. The fuel cell of claim 5, wherein:
the metal tube is spirally provided in the periphery the cell stack.

7. The fuel cell of claim 2, wherein:
the cell stack includes a lower end supported by a support base and extends upward in a vertical direction,
introduction portions introducing the reformed gas and the oxidizing agent gas are provided in a lower end portion of the cell stack, and
the heat-absorption part is provided in a periphery of an upper portion of the cell stack.

8. The fuel cell of claim 1, wherein:
the heat-absorption part is comprised of a metal tube installed in a space in the periphery of the cell stack.

9. The fuel cell of claim 2, wherein:
the heat-absorption part is comprised of a metal tube installed in a space in the periphery of the cell stack.

10. The fuel cell of claim 3, wherein:
the heat-absorption part is comprised of a metal tube installed in a space in the periphery of the cell stack.

11. The fuel cell of claim 4, wherein:
the heat-absorption part is comprised of a metal tube installed in a space in the periphery of the cell stack.

* * * * *